US011975679B2

United States Patent
Gosbee et al.

(10) Patent No.: US 11,975,679 B2
(45) Date of Patent: May 7, 2024

(54) RIDING HARNESS SYSTEM AND METHOD

(71) Applicant: Universal City Studios LLC, Universal City, CA (US)

(72) Inventors: Katarina Lin Gosbee, Orlando, FL (US); Dionté Omar Henderson, Orlando, FL (US); Steven C. Blum, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 17/877,335

(22) Filed: Jul. 29, 2022

(65) Prior Publication Data

US 2023/0029482 A1 Feb. 2, 2023

Related U.S. Application Data

(60) Provisional application No. 63/228,538, filed on Aug. 2, 2021.

(51) Int. Cl.
*B60R 22/14* (2006.01)
*B60R 22/48* (2006.01)
*B60R 21/00* (2006.01)

(52) U.S. Cl.
CPC .............. *B60R 22/14* (2013.01); *B60R 22/48* (2013.01); *B60R 2021/0097* (2013.01)

(58) Field of Classification Search
CPC . B60R 22/14; B60R 22/48; B60R 2021/0097; B60R 21/18;
(Continued)

(56) References Cited

U.S. PATENT DOCUMENTS 3,524,679 A 8/1970 Lavenne
4,508,045 A * 4/1985 Spanier .................... B63H 8/56
182/7
(Continued)

FOREIGN PATENT DOCUMENTS

DE 19829625 A1 * 11/1999 ............... A63G 1/28
EP 1147717 A1 * 10/2001 ............. B60N 2/265
(Continued)

OTHER PUBLICATIONS

Ballheim, Carousel, Nov. 4, 1999, EPO, DE 19829625 A1, Machine Translation of Description (Year: 1999).*
(Continued)

*Primary Examiner* — Amy R Weisberg
*Assistant Examiner* — Matthew D Lee
(74) *Attorney, Agent, or Firm* — Fletcher Yoder, P.C.

(57) ABSTRACT

A harness system configured to facilitate adjustably securing guests with varying body types within a ride vehicle. The harness system may include a harness body configured to releasably couple with the ride vehicle, a waist engagement portion of the harness body, the waist engagement portion including a waist securement mechanism configured to contract or expand a functional length of the waist engagement portion to adjust for engagement with a waist of a guest, a vest portion of the harness body, wherein the vest portion includes a height adjuster configured to extend or retract such that shoulder bands extend or retract relative to the waist engagement portion, and a leg engagement portion comprising a first leg flap configured to adjustably secure about a first leg of the guest and a second leg flap configured to adjustable secure about a second leg of the guest.

19 Claims, 6 Drawing Sheets

(58) Field of Classification Search
CPC .......... A61H 2201/1652; B62B 17/066; B62B 9/24; B63H 8/54; A61F 5/37; A41D 13/0007; A62B 35/00
USPC ........................................ 128/869, 874, 875
See application file for complete search history.

(56) References Cited

U.S. PATENT DOCUMENTS

| | | | | |
|---|---|---|---|---|
| 5,306,044 A | * | 4/1994 | Tucker | A44B 11/2542 |
| | | | | 280/808 |
| 5,544,363 A | * | 8/1996 | McCue | A62B 35/04 |
| | | | | 2/463 |
| 5,839,965 A | * | 11/1998 | Mullins | A47D 13/105 |
| | | | | 472/133 |
| 2005/0179244 A1 | * | 8/2005 | Schroth | B60R 22/14 |
| | | | | 280/808 |
| 2006/0157298 A1 | * | 7/2006 | Beggrow | A62B 35/0056 |
| | | | | 182/36 |
| 2008/0222809 A1 | * | 9/2008 | Okell | A47G 9/068 |
| | | | | 5/482 |
| 2013/0116604 A1 | * | 5/2013 | Morilla | A63G 9/12 |
| | | | | 601/33 |
| 2015/0069812 A1 | * | 3/2015 | Kim | B60R 22/14 |
| | | | | 297/465 |
| 2018/0201224 A1 | | 7/2018 | Zamperla | |
| 2019/0135225 A1 | * | 5/2019 | Kim | B60R 22/20 |
| 2019/0184935 A1 | | 6/2019 | Blum | |
| 2019/0315307 A1 | | 10/2019 | Macaluso et al. | |
| 2019/0366141 A1 | * | 12/2019 | Cylvick | A63B 21/4011 |
| 2020/0346603 A1 | * | 11/2020 | Freedman | B60R 21/02 |

FOREIGN PATENT DOCUMENTS

| | | | | |
|---|---|---|---|---|
| JP | 2001336003 A | * | 12/2001 | |
| WO | 0035723 A1 | | 6/2000 | |
| WO | WO-2018074634 A1 | * | 4/2018 | ............ A63G 1/00 |
| WO | WO-2018104858 A1 | * | 6/2018 | .......... B60R 22/001 |

OTHER PUBLICATIONS

PCT/US2022/038920 International Search Report and Written Opinion dated Oct. 25, 2022.

* cited by examiner

RIDING HARNESS SYSTEM AND METHOD

CROSS-REFERENCE TO RELATED APPLICATIONS

This application claims priority to U.S. Provisional Application No. 63/228,538 filed Aug. 2, 2021, entitled "RIDING HARNESS SYSTEM AND METHOD," which is hereby incorporated by reference in its entirety for all purposes.

BACKGROUND

Amusement park-style ride systems are becoming more and more popular among different types of people. For example, people of all different types are known to enjoy dark rides, rollercoasters, log flumes, carousels, and the like. With different types of people taking an interest in experiencing such ride systems, it is now recognized that there is a need to improve accessibility to such ride systems. More specifically, it is now recognized that there is a need to provide ride restraint systems that can accommodate people with differing needs (e.g., people with different body types).

This section is intended to introduce the reader to various aspects of art that may be related to various aspects of the present disclosure. This discussion is believed to be helpful in providing the reader with background information to facilitate a better understanding of the various aspects of the present disclosure. Accordingly, it should be noted that these statements are to be read in this light and not as admissions of prior art.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a harness system may be configured to facilitate adjustably securing guests with varying body types within a ride vehicle. The harness system may include a harness body configured to releasably couple with the ride vehicle and a waist engagement portion of the harness body, the waist engagement portion including a waist securement mechanism configured to contract or expand a functional length of the waste engagement portion to adjust for engagement with a waist of a guest. The harness system may also include a vest portion of the harness body, wherein the vest portion includes a height adjuster configured to extend or retract such that shoulder bands extend or retract relative to the waist engagement portion and a leg engagement portion comprising a first leg flap configured to adjustably secure about a first leg of the guest and a second leg flap configured to adjustable secure about a second leg of the guest.

In an embodiment, a ride restraint system may be configured to adjustably secure guests with varying body types during an active portion of a ride. The ride restraint system may include a ride harness and a ride vehicle of the ride. The ride harness may include a vest having a front side and a back side, a strap coupled to the front side of the vest, the strap comprising at least one keylock, a connector coupled to the back side of the vest and configured to adjustably secure the vest about a torso of a guest, and a leg engagement portion comprising a leg restraint configured to adjust- ably secure about a leg of the guest. The ride vehicle of the ride may include a plurality of brackets configured to receive the at least one keylock of the ride harness to secure the ride harness to the ride vehicle and a restraint configured to limit access to the ride harness during the active portion of the ride with the restraint in an engaged configuration.

In an embodiment, a ride harness system may include a vest, one or more straps disposed on a first side of the vest configured to provide restraint to a guest on a ride vehicle during an active portion of a ride, a connector disposed on a second side of the vest configured to lock the guest within the vest, wherein the connector is located out of reach by the guest, a first leg restraint configured to adjustably secure about a first leg of the guest, and a second leg restraint configured to adjustably secure about a second leg of the guest.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
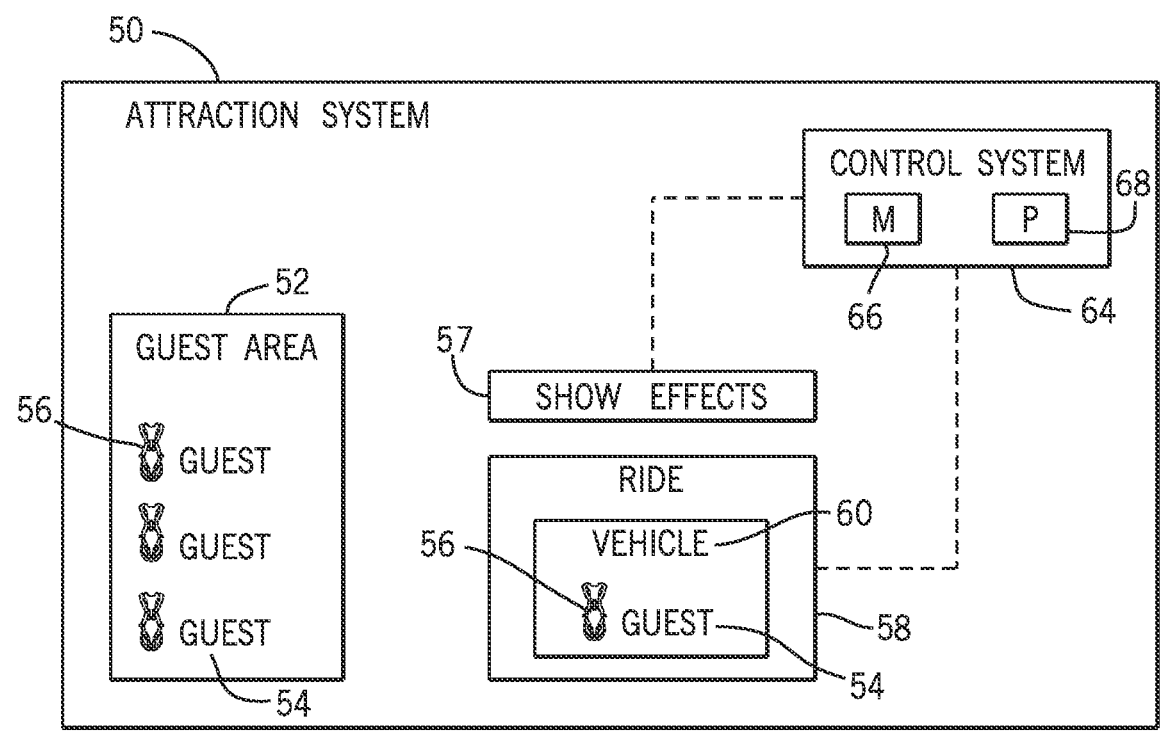
FIG. 1 is a schematic diagram of an embodiment of an attraction system with a ride restraint system, in accordance with an embodiment of the present disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The present disclosure is directed to a ride restraint system for an amusement park or theme park. The ride restraint system may include a ride harness that can accommodate a wide range of individuals (e.g., individuals with limb differences, atypical body types, asymmetric limb characteristics). Further, the ride harness of the ride restraint system may facilitate thorough restraint of individuals within a potential movement envelope. The ride restraint system may also include one or more anchors (e.g., brackets, receptacles, hooks, latches) installed into the seats of the ride vehicle that receive or otherwise couple with the ride harness to provide securement relative to the ride vehicle. As such, the ride restraint system may facilitate broad access to different types of ride systems for different types of individuals.

Present embodiments are directed to an adaptable, tamper-proof, full-body harness that may provide additional support and restraint for a guest (e.g., rider) of the ride system (e.g., an amusement ride/attraction). For example, the presently disclosed ride harness may provide additional restraint for individuals with differing body types, restraint engagement preferences, and physical characteristics. As further described with reference to FIGS. 2-4, the ride harness may secure the torso of the guest by wrapping around the shoulders and waist. The ride harness may also include lower limb straps (e.g., loops) that are operable to extend around and secure the guest's lower limbs. These loops may be fully adjustable based on differences in the guest's limbs. For example, if one leg is smaller than the other leg, adjustments between the loops may facilitate proper engagement with each leg despite the difference. When an adjustable point (e.g., height adjuster, low limb adjuster) is in reach of the guest, a key may be required to unlock the adjustable point for adjustment or a blocking feature may be utilized to prevent access (at least during an active riding scenario). For example, a flexible overlay (e.g., for friction based turnbuckles) may be utilized to prevent adjustment when the guest is on the ride. Further, in accordance with present embodiments, the connection points from the harness to the ride vehicle may require a locking carabiner that can only be unlocked by a ride operator or the like.

With the preceding in mind, FIG. 1 is a schematic diagram of an embodiment of an attraction system 50 of an amusement park. For example, the attraction system 50 may include a roller coaster, a motion simulator, a dark ride, a water ride, a walk-through attraction (e.g., a maze), and the like. The attraction system 50 may include a guest area 52 where various guests 54 may be located. In an embodiment, the guest area 52 may include an open space, such as a walkable area (e.g., a queue or line) where guests 54 may enter the attraction system 50, exit the attraction system 50, or otherwise navigate through the attraction system 50. In the guest area 52, the guest 54 may receive a ride harness 56 (e.g., full-body harness) from a ride operator before entering a ride 58 which may include a vehicle 60. The ride 58 may, for example, include a roller coaster, a water ride, a motion simulator, a dark ride, and so forth. To this end, the vehicle 60 may move (e.g., translate, rotate, pivot) about a motion base and/or along a track (e.g., a path or rail) of the attraction system 50 in an embodiment. Indeed, the ride 58 may entertain the guest(s) 54 via movement of the vehicle 60, such as by providing certain movement sensations for the guest(s) 54. As such, it may be beneficial to provide extra restraint to certain guests 54 during the ride 58. In an additional or alternative embodiment, the vehicle 60 may remain stationary at a platform of the ride 58 within the attraction system 50. For example, during loading and unloading of the ride 58, the ride vehicle 60 may be stationary for guests 54 to enter or leave the vehicle 60.

Before entering the ride 58, the guest 54 may receive the ride harness 56 to secure the guest 54. The ride harness 56 may include a harness body with adjustable points to accommodate the guest 54. The ride operator may provide the guest 54 with instructions for putting on the ride harness 56 and then check the fit. For example, the ride operator may provide a demonstration to the guests 54 on how to put on and adjust the ride harness 56. In some cases, the guest 54 may be accompanied by other individuals (e.g., family, friends) who may help the guest 54 put on the ride harness 56. The individuals or the guest 54 may lift the harness 56, insert the guest 54 into the ride harness 56, drape the harness 56 over the guest's head, tighten or loosen one or more adjustable points on the ride harness 56, or otherwise secure the harness 56 to the guest 54. Securement points of the harness 56 may be readily accessible and observable. As such, present embodiments allow the ride operator to ensure proper fitting of the ride harness 56 without touching or interacting with the guests 54. Once the ride harness 56 is fitted, the ride operator may double check the fit of the harness 56. For example, the operator may gently tug on the adjustable points of the ride harness 56 to ensure that the ride harness 56 is firmly attached.

The attraction system 50 may also include show effects 57 (e.g., an instructional presentation provided via a display, an animated figure, a speaker), which may be operated to provide additional information regarding the ride harness 56. For example, the show effects 57 may include a video displayed on a screen, audio outputted from a speaker, or one or more poster(s) with a visual representation of steps to put on and adjust the ride harness 56. The show effects 57 may also discuss safety features of the ride harness 56, requirements for the attraction system 50 (e.g., height, weight, size), specifications of the attraction system 50 (e.g., speed, special effects), and the like. The guest 54 may receive the instructions for putting on the ride harness 56 and ask the ride operator for additional assistance. Although the show effects 57 are located outside of the guest area 52 in the illustrated attraction system 50, the show effects 57 may be at least partially located within the guest area 52 in an additional or an alternative attraction system 50.

The guest 54 may enter the ride 58 from the guest area 52 and the ride operator may secure the guest 54 to the ride vehicle 60. For example, the ride vehicle 60 may include a seat with restraints (e.g., shoulder restraint, hip restraint, waist restraint) to secure the guest 54 during twists and turns of the ride 58. The guest 54 may select a seat of the ride vehicle 60 and the ride operator may secure the guest 54 to the ride vehicle 60 by one or more connection points. For example, the ride vehicle 60 may include one or more clips, fasteners, brackets, or the like that may receive the ride harness 56. Furthermore, the ride operator may lower the restraints to ensure the guest 54 is supported and restrained during the ride 58. In this way, the ride harness 56 may brace (e.g., support) the guest 54 during movement of the vehicle 60. After the ride 58, the ride operator may unbuckle the guest 54 from the ride vehicle 60 and the guests 54 may exit the vehicle 60 to the guest area 52 to move between the guest area 52 and the ride 58.

The attraction system 50 may also include a control system 64 (e.g., an automated or programmable controller) configured to operate the ride 58 and/or the show effects 57. The control system 64 may include a memory 66 and processing circuitry 68. The memory 66 may include volatile memory, such as random access memory (RAM), and/or non-volatile memory, such as read-only memory (ROM), optical drives, hard disc drives, solid-state drives, or any other non-transitory computer-readable medium that includes instructions to operate the attraction system 50. The processing circuitry 68 may be configured to execute such instructions. For example, the processing circuitry 68 may include one or more application specific integrated circuits (ASICs), one or more field programmable gate arrays (FPGAs), one or more general purpose processors, or any combination thereof.

The control system 64 may be communicatively coupled to the show effects 57 and the ride 58. For example, the control system 64 may start and stop the instructional video or audio in the guest area 52 provided as the show effects 57 or separately, control the appearance of the visual or audio effects provided by the show effects 57, such as a sound, a pitch, or a speed. In another example, the control system 64 may control movement of the vehicle 60 within the attraction system 50, adjust or change one or more parameters of the ride 58, or the like. In certain embodiments, the ride operator may use the control system 64 to start or stop the show effects 57, the ride 58, related ride features, or a combination thereof.

Figure 2:
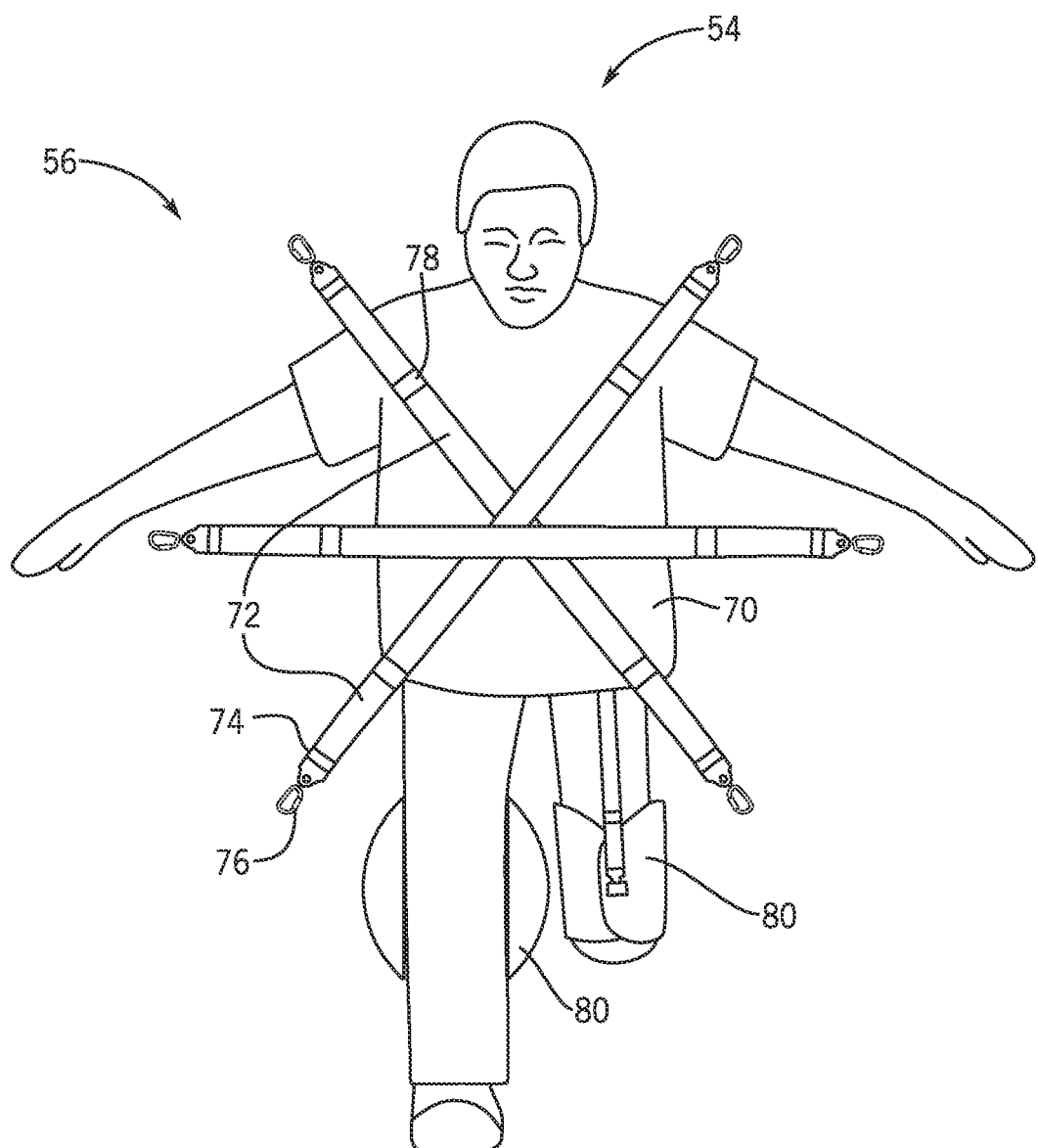
FIG. 2 is a front view of a riding hardness, in accordance with an embodiment of the present disclosure.

With the foregoing in mind FIG. 2 illustrates a schematic front view of the guest 54 engaging with the ride harness 56. The ride harness 56 may be a full-body harness that includes a harness body 70 that extends over the guest's torso and a leg restraint 80 that extends about the guest's lower limbs. The harness body 70 may be made from a lightweight mesh material, such as a polymer, synthetic fiber, or the like to be soft, durable, and easily moldable to the guest's torso. The harness body 70 may have an opening for the guest's head, arms, and waist. A front side of the harness 56 (e.g., with respect to a frontside of the guest) may include one or more straps 72 with a strap adjuster 74, a keylock 76, and a clamp 78. In the illustrated embodiment, the ride harness 56 may include three straps 72 across the harness body 70 and two keylocks 76 per strap 72, however in certain embodiments there may be any suitable number of straps 72 and/or keylocks 76. For example, a first strap 72 may go diagonally across the harness 56 starting from a right shoulder and to a left leg, while a second strap 72 may start from a left shoulder to a right leg. A third strap 72 may extend across the torso of the guest 54 in a horizontal direction. The straps 72 made be made from a firm woven material and gently restrain the guest 54 during movement of the vehicle 60. Each end of the straps 72 may include a strap adjuster 74 to change a length of the straps 72, such as extending or retracting functional strap lengths. The strap adjuster 74 may be a plastic or metal buckle with a locking bar. The strap 72 may be woven between the locking bars and adjusted by pulling or loosening the ends of the straps 72. Adjusting the keylocks 76 to be positioned at different locations along the straps 72 will adjust the functional length. For example, using the strap adjuster 74 to bring the keylocks 76 of a particular one of the straps 72 closer together will result in a shortened functional strap length. In another example, bringing the keylocks 76 farther away, via the strap adjuster 74 will result in a longer functional strap length. The strap adjuster 74 may be connected to the keylock 76, which is configured to be received by the ride vehicle 60.

The straps 72 may also include the keylock 76 configured to be received by the ride vehicle 60. The keylock 76 may include a coupling link with a safety closure that may connect the ride harness 56 to the vehicle 60. In one embodiment, the keylock 76 includes a double locking carabiner with a safety closure, a fastener, a lock, or the like. For example, the keylock 76 may be a carabiner with a first loop to connect the ride harness 56 and a second loop to lock. In an embodiment, the keylock 76 may include an additional lock on the second loop or a glove lock for triple redundant security. In yet another embodiment, the keylock 76 may include a hook operable to engage with a feature (e.g., a bracket or fixed loop) of the ride vehicle 60 and to be secured into place by a ratchet. While only a few such keylocks 76 are described, many such keylocks and different types of such keylocks may be employed in accordance with present embodiments. The keylocks 76 may lock into place via a coupling (e.g., a locking carabiner), via tension (e.g., a ratchet), or a different locking mechanism.

The straps 72 may also include one or more clamps 78 to secure the straps 72 during movement of the vehicle 60. The clamps 78 may be metal or plastic components that may slide up or down the straps 72. For example, the clamps 78 may include an acetate seatbelt clamp or a molded keeper. The clamps 78 may also be clipped to the straps 72 or unclipped from the straps 72 to allow the ride operator to easily relocate the clamps 78. The clamps 78 may also be placed over the straps 72 and connected to the ride harness 56 to prevent the straps 72 from moving or getting loose during movement of the ride vehicle 60. In this way, the straps 72 may remain flat and secure during the ride 58, such as under high speeds, high winds, or the like.

Furthermore, the ride harness 56 may include lower limb straps that employ leg restraint 80 (e.g., loops, lower limp straps). In certain instances, the guest 54 may have one leg that is shorter than the other (e.g., amputated). The leg restraint 80 may provide containment and support for the shorter leg. For example, the leg restraint 80 may be made from a soft, padded, elastic material that may conform to a shape or size of the guest's lower limbs. The leg restraint 80 may cup around the lower limb like a sock. The leg restraints 80 may include a securement mechanism 82 to assist the guest 54 in putting on the leg restraints 80 without assistance from another individual or the operator. The securement mechanism may include an extra loop, a ratchet band, an elastic connector band, a buckle, a hook and loop, or a strap adjuster. The guest 54 may pull the leg restraint 80 to secure it around their lower extremity and adjust the leg restraint 80 with the securement mechanism 82. For example, the guest 54 may use the strap adjuster of the securement mechanism 82 to extend the leg restraint 80 for fitting around a longer or larger lower limb. In another example, the guest 54 may also tighten the leg restraint 80 by bringing the strap adjuster of the securement mechanism 82 closer (e.g., relative to the guest's torso) for a tighter or snug fit. In another example, the leg restraint 80 may include material that wraps around the guest's lower limbs and close by a closing mechanism 84, such as a hook and loop mechanism or a buckling mechanism. For example, the leg restraint 80 may include a buckle that releasably couples to the closing mechanism 84. the closing mechanism 84 may include a strap coupled to a tab that wraps around the guest's lower limb and that fits into the buckle to secure the leg restraint 80. In an embodiment, the guest 54 may insert the tab into the buckle and pull the strap for a tighter fit on the legs. In another embodiment, the closing mechanism 84 includes the hook and loop mechanism. As such, the guest 54 may secure the leg restraint 80 by locking the hook and loop.

In certain embodiments, another individual may help the guest 54 put on the ride harness 56 including the leg restraint 80. For example, the individual may drape the ride harness 56 over the guest's head. The individual may lift the guest 54 to slide the leg restraints 80 from under the guest 54 and fit the leg restraint 80 around the leg of the guest 54. In an embodiment, the leg restraint 80 may not be useful to the guest 54, as such, the guest 54 may not close the leg restraint and allow it to lay flush underneath the leg of the guest 54. As such, the ride harness 56 may be adapted to fit different types of guests 54.

Figure 3:
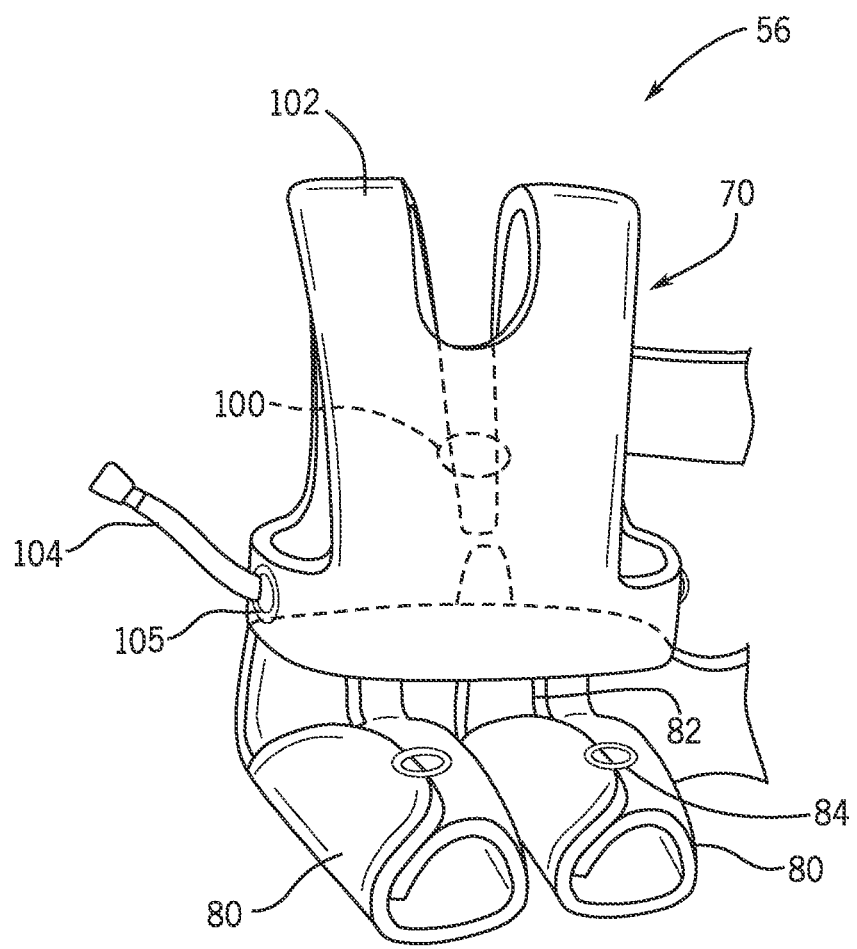
FIG. 3 is a front perspective view of a riding harness of FIG. 2, in accordance with an embodiment of the present disclosure.

FIG. 3 is a perspective view of ride harness 56 without the straps 72. The harness body 70 (e.g., vest portion of the harness) may extend over the guest's torso and securely engage about the torso via a connection 100 that would be adjacent the guest's back when the harness body 70 is properly positioned on the guest (in the engaged position). The connection 100 is shown in dashed lines to represent that it is being viewing through a portion of the harness body 70 in the illustrated embodiment. The connection 100 may be a locking mechanism, such as a zipper, a carabiner, a button, or the like that may be out of reach of the guest 54. The harness body 70 includes shoulder bands 102 with padding that provide for flexibility in bodily positioning, a range of engagement adjustment (e.g., via compression and expansion of the padding), and comfort. As described with reference to FIG. 4, a height of the harness body 70 can be adjusted via the illustrated adjustment feature or height adjuster 120 (e.g., a belt, slider, tensioner, elastic band) for changing relative positioning of the shoulder area and a waist area. Further, the harness body 70 includes a waist securement mechanism including an adjustable waist 104 (e.g., a draw string or belt) in the waist area (waist engagement portion of the harness) that facilitates securement about the guest's waist and a securing mechanism 105 for the adjustable waist 104 that may be behind and out of reach of the guest in the engaged position. The adjustable waist 104 may contract or expand a functional length in the waist area. The securing mechanism 105 may include a clamp, a stopper, a lock, or the like to prevent the adjustable waist 104 from extending or retracting after securement. The harness body 70 also includes straps 72 (as shown in FIG. 2, which may be representative of various engagement features) used to releasably couple the harness 56 to the ride vehicle 60.

Also illustrated in FIG. 3 are adjustable leg restraints 80 (e.g., loops, flaps), which may be connected to other features or separately attachable. As discussed above, these leg restraints 80 may adjustably extend about legs of the guest and secure the guest 54 to the rest of the harness 56 and/or the ride vehicle 60. When secured by the closing mechanism 84, the leg restraints 80 may transition into a sock-like or tube configuration and entirely encompass the guest's lower limb. The material of the leg restraint 80 may parallel to the guest's torso around the guest's lower limb and inwardly towards the guest's torso to wrap about the guest's lower limb. In this way, the leg restraint 80 may provide full support to the guest's lower limb. The adjustable leg restraints 80 may connect directly to the ride vehicle 60 or via their connection to the rest of the harness 56 (e.g., the harness body 70). Further, the securement mechanisms 82 of the leg restraints 80 may be inaccessible to the guest 54 after engagement (e.g., based on blocking of access by a ride vehicle restraint, such as a hip restraint) or they may never be reachable and positioned on a backside of the ride harness 56 for accessing by the ride operator. In some embodiments, various securement features may extend all the way through a ride vehicle seat so that the ride operator may secure the guest 54 to the harness 56 without contacting the guest 54.

Figure 4:
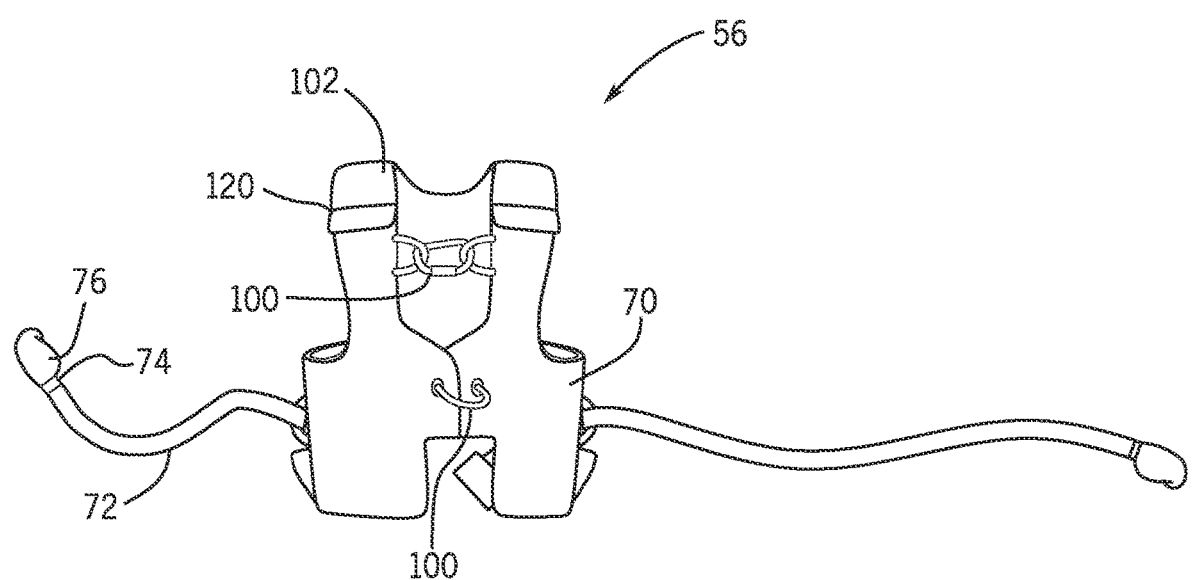
FIG. 4 is a back perspective view of the riding harness of FIG. 2, in accordance with an embodiment of the present disclosure.

FIG. 4 illustrates a back view of the ride harness 56 with the height adjuster 120 and a locking mechanism 122. As described herein, the ride harness 56 may be adjusted to a height of the guest 54 via the height adjuster 120 (e.g., a belt, slider, tensioner, elastic band). By placing the height adjuster 120 on the backside, the height adjuster 120 may be out of reach by the guest 54 and may prevent the guest 54 from tampering with the harness 56. Further, in an embodiment, the harness body 70 may open from a backside to prevent the guest 54 from reaching the connection 100. For example, an individual or the guest 54 may bring the ride harness 56 to the torso of the guest 54 such that the guest 54 may extend their arms through arm holes. The individual may secure the ride harness 56 about the guest 54 with the connection 100. The connection 100 may include a zipper, a clip, a fastener, a carabiner, or the like. For example, individual may secure the ride harness 56 about the guest 54 by clipping and locking a carabiner. In another example, the individual may zip a zipper along the backside of the ride harness 56. As such, the ride harness 56 may be both adjustable to fit the guest 54 and tamper-proof with respect to the guest 54.

In an embodiment, an additional key lock or glove lock option may be added to the connection 100 and/or the height adjuster 120. For example, the connection 100 may include a locking carabiner with an insertion point (e.g., hole) for a key to triple lock the carabiner. In another example, a glove locking mechanism may be used to lock the carabiner, thereby preventing other individuals from tampering with the ride harness 56. For example, a glove may include a special key or point that fits into the insertion point of the locking carabiner. In an embodiment, the ride operator or individual may use the glove to lock the connection 100, thereby preventing tampering with the ride harness 56. Further, the leg restraints 80 may include the additional key lock or glove locking mechanism to secure the ride harness 56 about the guest 54. The additional key lock may be standardized such that one key (e.g., master key) or one glove may be used to unlock all connection(s) 100 of the ride harness(es) 56.

Figure 5:
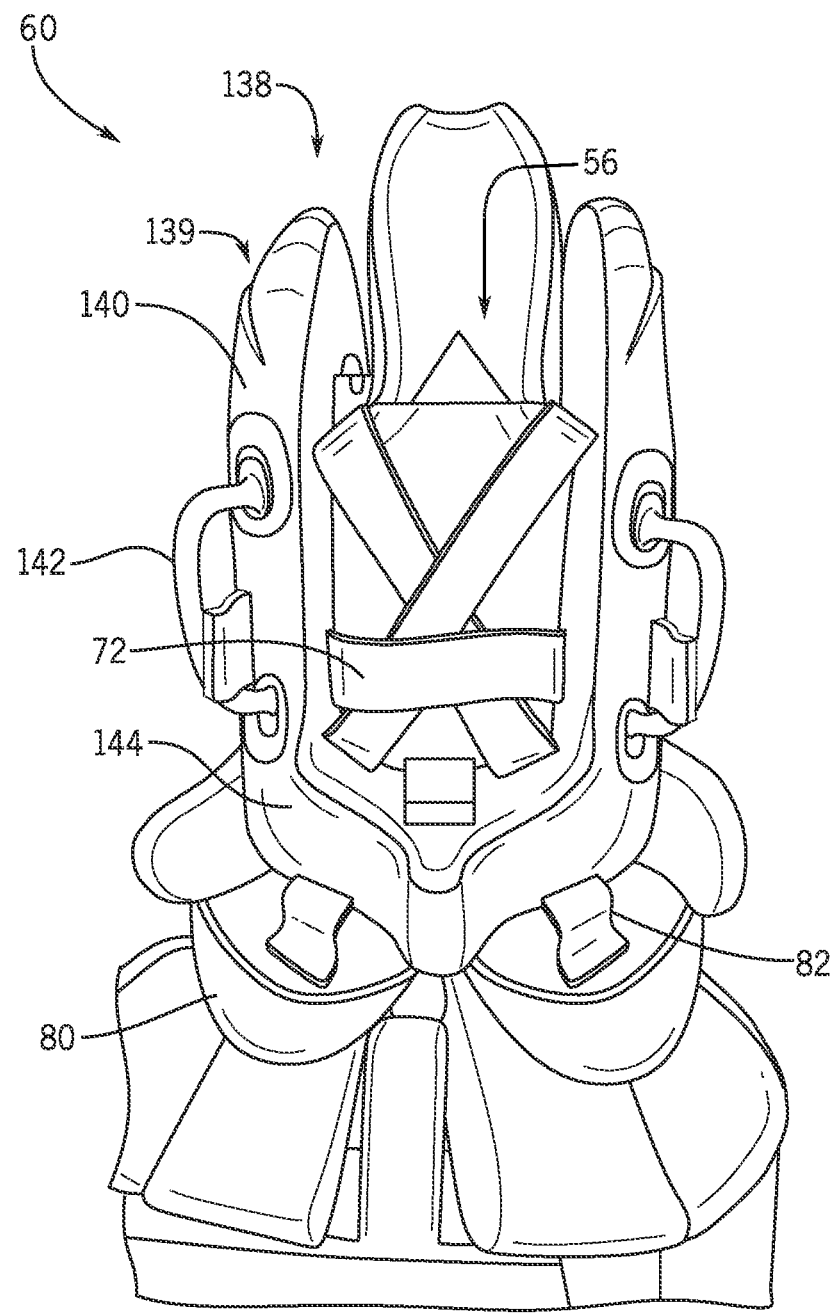
FIG. 5 is a front perspective view of the riding harness of FIG. 2 strapped into a ride vehicle, in accordance with an embodiment of the present disclosure.

FIG. 5 illustrates a front view of the ride harness 56 connected to a seat 138 of the ride vehicle 60. The guest 54 wearing the ride harness 56 may select the seat 138 of the ride vehicle 60 from among a number of available seats. Various restraints 139 of the ride vehicle 60 may provide an extra layer of restraint to secure the guest 54. The restraints 139 may rest on top of the ride harness 56, thereby preventing the guest 54 from reaching or tampering with the locking mechanisms on the ride harness 56. In the illustrated example of FIG. 5, the ride vehicle 60 includes a shoulder restraint 140 with a handlebar 142, a hip restraint 144, and a head rest 146. The shoulder restraint 140 and the hip restraint 144 block access to aspects of the ride harness 56 when they are in an engaged position (e.g., in position to secure a passenger within the ride vehicle 60). The shoulder restraint 140 may move in a vertical direction and include a locking mechanism to secure the shoulders of the guest 54. The shoulder restraint 140 may fit over the shoulder bands 102 of the ride harness 56 and apply a light pressure to the shoulders. The shoulder bands 102 may provide a barrier between the guest 54 and the shoulder restraint 140, thereby relieving some pressure from the guest's shoulders. The shoulder restraint 140 and the hip restraint 144 are connected and move together in the illustrated embodiment. However, in other embodiments, multiple separate restraints may be employed.

After the guest 54 is seated in the ride vehicle 60, the ride operator may check that the seat 138 is in a desired orientation (e.g., a fully upright position, approximately 90 degrees relative to a path) and that a backside of the guest 54 is in full contact with the seat 138. The ride operator may firmly pull down on the shoulder restraint 140 and gently push it against the guest's body to ensure a close fit. The shoulder restraint 140 may be in contact with the shoulder bands 102 of the riding harness 56 and secure the torso of the guest 54 to the ride vehicle 60. The locking mechanism within the shoulder restraint 140 may activate, thereby securing the guest 54 within the ride vehicle 60. The ride operator may pull up on the shoulder restraint 140 to ensure that it is locked into place. The shoulder restraint 140 may include the handlebar 142 for the guest 54 to hold onto during the ride 58.

Additionally or alternatively, the hip restraint 144 may be pulled over the guest 54 in parallel with the shoulder restraints 140. For example, the hip restraint 144 may be connected to the shoulder restraint 140 and the ride operator may fit the hip restraint 144 over a lap of the guest 54. Once in place, a locking mechanism of the hip restraint 144 may activate and secure the guest 54 to the seat 138. The ride operator may push down or pull up on the hip restraint 144 to ensure that the locking mechanism activated. In an embodiment, the hip restraint 144 may include a buckle that connects to a strap of the ride vehicle 60. In this way, the ride restraint system may include multiple locking points to facilitate establishing a secure fit for the guest 54. Further, the hip restraint 144 may be placed above or on top of the lower limbs of the guest 54, blocking the guest 54 from tampering with the leg restraints 80. For example, the hip restraint 144 may snugly placed at the hip area, thereby preventing the guest 54 from reaching over to tamper with the securement mechanisms of the leg restraints 80. In another example, the hip restraint 144 may be located directly above the securement mechanisms 82, as such blocking access to the securement mechanisms 82.

In the illustrated embodiment, the straps 72 may also serve as a waist restraint. As described with respect to FIG. 2, a strap 72 may go horizontal across the torso of the guest 54 and may act as the waist restraint. The ride operator may connect the strap 72 (via the keylock 76) to the ride vehicle 60 and pull on the strap 72 to ensure that ride harness 56 (via the strap 72) may be attached to the ride vehicle 60. Further, the ride vehicle 60 may include the head rest 146 that may limit a movement of the guest's head. As such, the restraints of the ride vehicle 60 may brace the guest 54 during the ride 58.

Figure 6:
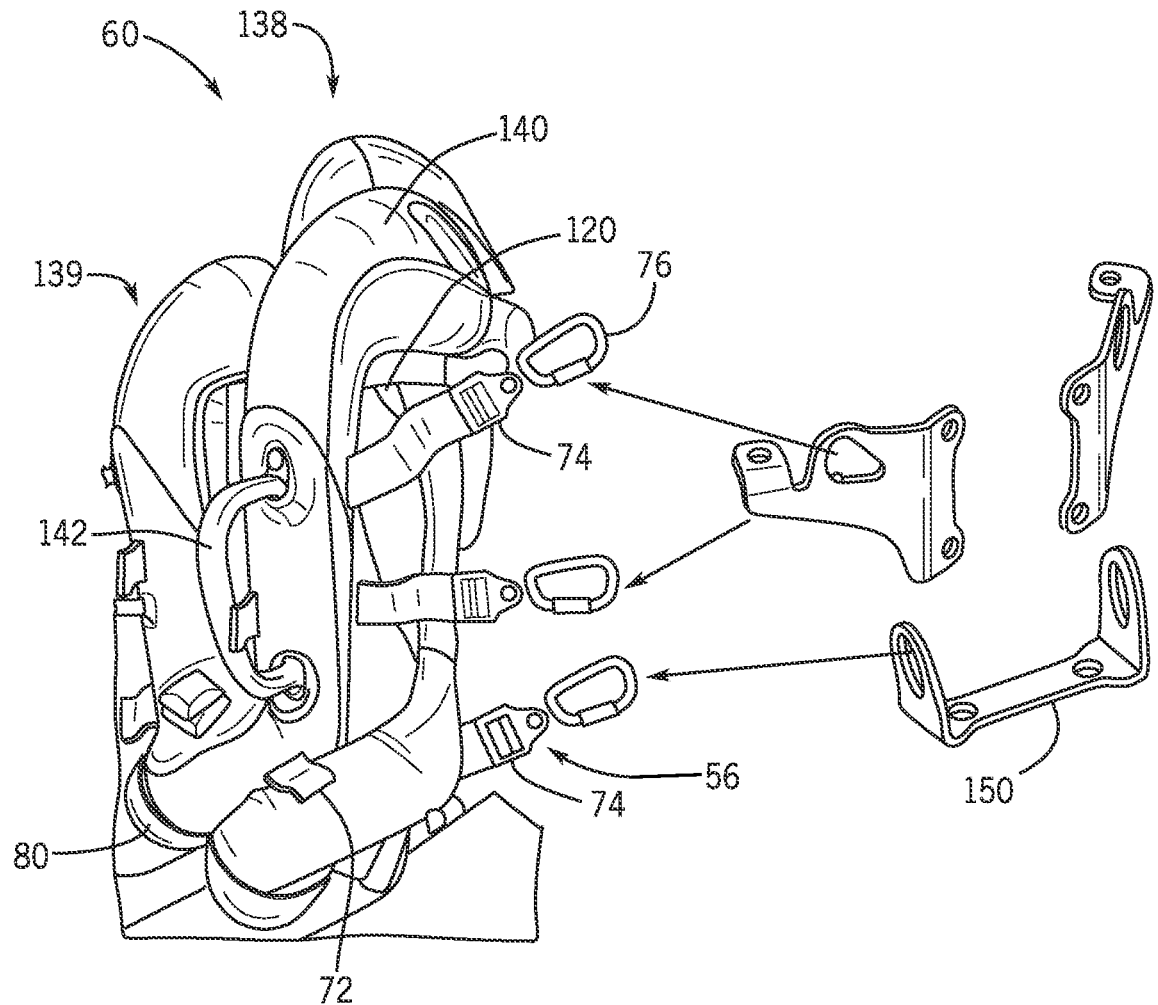
FIG. 6 is a side perspective view of the riding harness of FIG. 2 strapped into the ride vehicle, in accordance with an embodiment of the present disclosure.

FIG. 6 illustrates a side view of the ride vehicle 60 connected to the ride harness 56 via one or more brackets 150, which may be representative of any receptacle or securement device. The brackets 150 may be permanently or semi-permanently installed to any seat of the ride vehicle 60. The brackets 150 may be metal or plastic components fastened to the seat by screws, washers, nuts, bolts, or the like. The seat 138 of the ride vehicle 60 may include three brackets on either side of the seat 138 to releasably couple to the keylocks 76 of the harness 56. For example, the brackets 150 may be installed on exterior seats and/or middle rows of the ride vehicle 60 in order to ease the ride operator's access and limit experience of acceleration forces by the guests 54. The connection points (e.g., location of the brackets 150) may change from one ride to another ride depending on the specifications of the ride, however the ride harness 56 may remain the same due to the adjustable components.

Once the guest 54 is be seated in the ride vehicle 60, the ride operator may start with inboard attachments situated towards a platform of the ride 58. The ride operator may releasably couple each of the keylocks 76 of the ride harness 56 to the brackets 150 of the ride vehicle 60. For example, the ride operator may insert each of three keylocks 76 into a respective bracket(s) 150 and lock the three keylocks 76. In an embodiment, the ride operator may use a key or a glove to triple lock the keylocks 76. Further, the ride operator may use the strap adjuster 74 to adjust a functional length of the strap 72 to secure the guest 54 to the ride vehicle 60.

Then, the operator may perform outboard attachments situated away from the platform of the ride 58. Before the ride vehicle 60 leaves the platform, the ride operator may perform a safety check by fully closing and checking the ride restraint system for each seat 138, including seats not presently occupied by guests 54. In an embodiment, preparation for the ride 58 may include multiple ride operators releasably coupling the ride harness 56 in parallel. In this way, time spent by the ride vehicle 60 at the platform may be limited and throughput of guests 54 may be increased for the ride 58 relative to other techniques.

Present embodiments may be superior to traditional restraints because the present embodiments provide customization, additional securement, and improved functionality (e.g., tamper proofing). Indeed, the ride restraint system may be customized for specific attractions, tamper proof, and operationally feasible to ensure that the ride harness may be properly attached to both the guest and a ride vehicle. The ride restraint system described herein may be installed in both new and existing ride systems. Installation of the ride restraint system includes securing one or more brackets to the ride vehicle with screws, washers, nuts, bolts, and so on to securely attach the ride harness. Furthermore, a number of brackets may be added or removed and a placement of the bracket may be determined based on specifications of the ride. Additionally or alternatively, the ride harness may be designed or customized to the attraction (e.g., ride). As such, the ride restraint system may provide broader accessibility to ride systems for different types of guests.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A harness system configured to facilitate adjustably securing guests with varying body types within a ride vehicle, the harness system comprising:
    a harness body comprising a strap configured to circumscribe at least partially around or extend at least partially across a waist of a guest, wherein the harness body is configured to act as a waist restraint and releasably couple with the ride vehicle of an attraction system;
    a waist engagement portion of the harness body, the waist engagement portion including a waist securement mechanism configured to contract or expand a functional length of the waist engagement portion to adjust for engagement with the waist of the guest;

a vest portion of the harness body, wherein the vest portion includes a height adjuster configured to extend or retract such that shoulder bands extend or retract relative to the waist engagement portion; and a leg engagement portion comprising a first leg flap configured to adjustably secure about a first leg of the guest and a second leg flap configured to adjustably secure about a second leg of the guest.

2. The harness system of claim 1, wherein an end of the strap comprises a strap adjuster configured to change a functional length of the strap and a keylock configured to attach to the ride vehicle.

3. The harness system of claim 1, wherein the harness body comprises additional straps extending diagonally across the harness body from a first shoulder band to an opposite leg flap.

4. The harness system of claim 2, wherein the keylock comprises a double locking mechanism configured to couple the harness body to the ride vehicle.

5. The harness system of claim 4, wherein the keylock comprises an additional keylock or glove lock mechanism comprising a triple locking mechanism.

6. The harness system of claim 1, wherein:

the vest portion of the harness body comprises a locking mechanism configured to secure the vest portion about the waist of the guest, wherein the locking mechanism is a double locking mechanism.

7. The harness system of claim 1, wherein the first leg flap is configured to lay flush between the first leg of the guest and a seat of the ride vehicle.

8. The harness system of claim 1, wherein the leg engagement portion comprises a locking mechanism configured to lock to prevent the guest from adjusting the first leg flap or the second leg flap.

9. A ride restraint system configured to adjustably secure guests with varying body types during an active portion of a ride, the ride restraint system comprising:

a ride harness comprising:

a vest having a front side and a back side;

a strap coupled to the front side of the vest, the strap comprising at least one keylock;

a connector coupled to the back side of the vest and configured to adjustably secure the vest about a torso of a guest;

a leg engagement portion comprising a leg restraint configured to adjustably secure about a leg of the guest; and a ride vehicle of the ride comprising:

a plurality of brackets configured to receive the at least one keylock of the ride harness to secure the ride harness to the ride vehicle; and a restraint configured to limit access to the ride harness during the active portion of the ride with the restraint in an engaged configuration.

10. The ride restraint system of claim 9, wherein the restraint comprises a hip restraint configured to lay on top of the leg restraint in the engaged configuration and block the guest from adjusting the leg restraint.

11. The ride restraint system of claim 9, wherein the restraint comprises a shoulder restraint configured to lay on top of the vest and limit movement of the torso of the guest during the active portion of the ride.

12. The ride restraint system of claim 11, wherein the vest comprises a shoulder pad configured to come into contact with the shoulder restraint.

13. The ride restraint system of claim 9, wherein the back side of the vest comprises a height adjuster configured to change a functional length of the vest to fit the guest.

14. The ride restraint system of claim 9, wherein the connector comprises a double locking carabiner configured to prevent tampering by the guest.

15. The ride restraint system of claim 9, wherein the leg engagement portion is configured to lay flush between the leg of the guest and the ride vehicle when the leg engagement portion is not in use.

16. The ride restraint system of claim 9, wherein the vest comprises a waist adjustment mechanism configured to expand or contract a functional width of the vest to fit to the torso of the guest.

17. The ride restraint system of claim 9, wherein the vest is integral with the leg engagement portion.

18. A ride harness system comprising:

a vest;

one or more straps disposed on a first side of the vest configured to provide restraint to a guest on a ride vehicle during an active portion of a ride;

a connector disposed on a second side of the vest configured to lock the guest within the vest, wherein the connector is configured to be located out of reach by the guest during the active portion of the ride;

a first leg restraint configured to adjustably secure about a first leg of the guest; and a second leg restraint configured to adjustably secure about a second leg of the guest.

19. The ride harness system of claim 18, wherein the ride vehicle comprises one or more brackets configured to receive the one or more straps and couple to the vest.

* * * * *